United States Patent [19]

Takata et al.

[11] Patent Number: 4,627,400
[45] Date of Patent: Dec. 9, 1986

[54] PORTING SYSTEM FOR INTERNAL COMBUSTION ENGINE

[75] Inventors: Toshihiko Takata; Yoshiharu Nakayama, both of Hamamatsu, Japan

[73] Assignee: Yamaha Hatsudoki Kabushiki Kaisha, Iwata, Japan

[21] Appl. No.: 759,602

[22] Filed: Jul. 26, 1985

[30] Foreign Application Priority Data

Jul. 27, 1984 [JP] Japan ............................. 59-155470

[51] Int. Cl.$^4$ ............................................. F02B 15/00
[52] U.S. Cl. ................................... 123/432; 123/580; 123/52 MB
[58] Field of Search ............... 123/579, 580, 583, 584, 123/308, 432, 52 MB

[56] References Cited

U.S. PATENT DOCUMENTS

| 4,262,639 | 4/1981 | Motosugi et al. | 123/188 M |
| 4,270,500 | 6/1981 | Nakagawa et al. | 123/432 |
| 4,450,793 | 5/1984 | Sumiyoshi et al. | 123/308 |
| 4,488,531 | 12/1984 | Tadokoro et al. | 123/432 |
| 4,497,288 | 2/1985 | Nakano et al. | 123/52 M |

FOREIGN PATENT DOCUMENTS

| 173525 | 10/1982 | Japan | 123/432 |
| 183553 | 11/1982 | Japan | 123/308 |
| 186009 | 11/1982 | Japan | 123/90.27 |
| 47109 | 3/1983 | Japan | 123/315 |
| 10778 | 1/1984 | Japan | 123/432 |
| 687528 | 2/1953 | United Kingdom | 123/315 |

Primary Examiner—E. Rollins Cross
Attorney, Agent, or Firm—Ernest A. Beutler

[57] ABSTRACT

An induction system for an internal combustion engine wherein each chamber of the engine is provided with three intake ports and one charge former serves two of those intake ports while another charge former serves the other intake port. The charge formers employ a staged throttle valve arrangement so that the other charge former supplies the idle and low speed requirements and the first mentioned charge former comes into operation only at high speeds and loads. In accordance with another feature, the arrangement is provided for pairs of chambers and the single charge former serves two chambers.

31 Claims, 3 Drawing Figures

1

PORTING SYSTEM FOR INTERNAL COMBUSTION ENGINE

BACKGROUND OF THE INVENTION

This invention relates to a porting system for internal combustion engines and more particularly to an improved porting arrangement for engines having plural intake ports for each chamber.

It is well known that the specific output of an internal combustion engine can generally be improved by providing plural intake ports for each chamber of the engine. By using plural ports, it is possible to obtain higher rotational speeds, greater inlet area and greater specific output. However, the use of such plural ports to achieve high performance can seriously and adversely affect the low speed running of the engine. Because of the large effective port area, the gas velocities at low speeds become extremely slow and poor fuel economy and other poor running results.

It is, therefore, a principal object of this invention to provide an improved porting arrangement for internal combustion engines that permits the achievement of high specific outputs and yet which will insure good low speed running.

It is a further object of this invention to provide an improved porting system for internal combustion engines that assists the performance throughout the engine speed and load ranges.

In accordance with a feature of the invention, a staged induction porting arrangement is utilized for the chambers of an internal combustion engine. The engine is provided with plural intake ports and one port is employed for primarily serving the low speed running while other ports are employed for assisting high speed performance. Separate charge formers are employed for the low and high speed ports. Although this arrangement is particularly effective, when employed with multiple chamber internal combustion engines, it can become rather complicated.

It is, therefore, a still further object of this invention to provide an improved porting and induction system for multiple chamber engines that will achieve the aforenoted results while still maintaining a relatively uncomplicated construction.

SUMMARY OF THE INVENTION

A first feature of this invention is adapted to be embodied in an internal combustion engine having a variable volume chamber and including first, second and third intake passages each of which serve the chamber through respective, first, second and third intake ports. A first charge former supplies a fuel/air mixture to the chamber through the first and second intake passages and a second charge former supplies a fuel/air mixture to the chamber through the third intake passage.

Another feature of the invention is adapted to be embodied in an induction system for an internal combustion engine that has first and second variable volume chambers. A first intake passage serves the first chamber through a first intake port and a second intake passage serves the second chamber through a second intake port. A third intake passage serves both the first and second chambers through separate third and fourth intake ports and a single charge former supplies a fuel/air mixture to the first and second chambers through the third intake passage.

DETAILED DESCRIPTION OF THE PREFERRED EMBODIMENT

Figure 1:
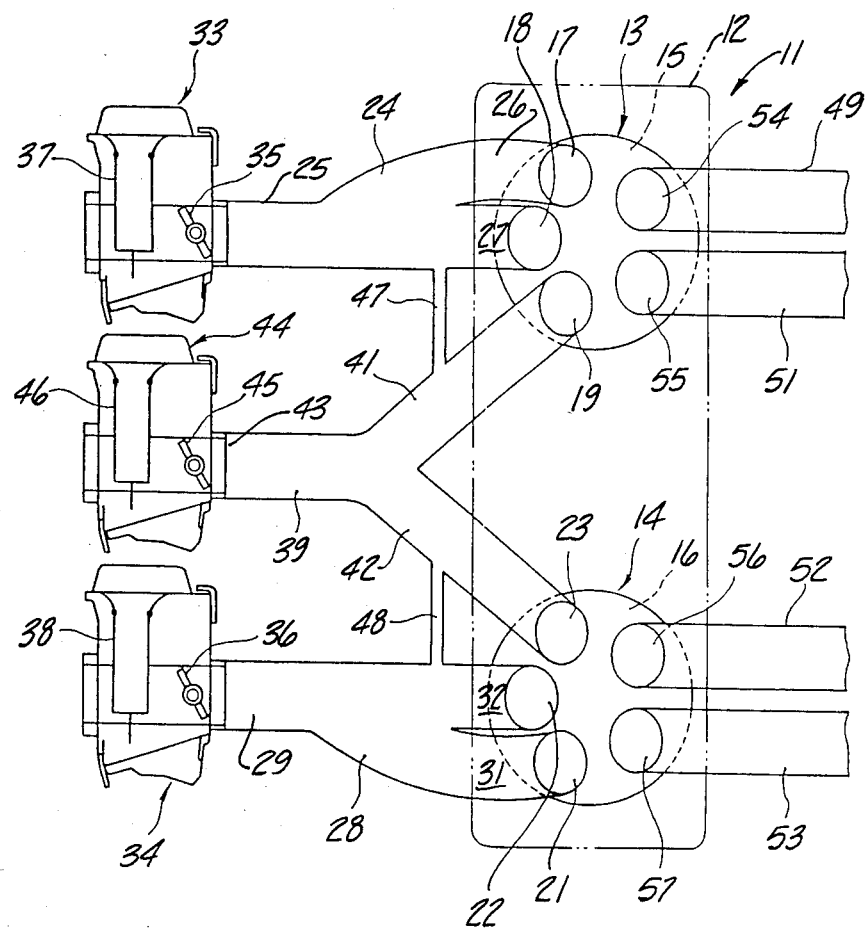
FIG. 1 is a partially schematic top plan view showing an internal combustion engine constructed in accordance with an embodiment of the invention.

Referring now in detail to the drawings and first to FIG. 1, an internal combustion engine having an induction system constructed in accordance with an embodiment of the invention is indicated generally by the reference numeral 11. Inasmuch as the invention is directed toward the induction and porting system for the engine, only this portion of the engine has been shown in solid lines and the remaining components have been illustrated in phantom, schematically or not illustrated at all. These remaining components may be considered to be conventional, as will become apparent.

The engine 11 is comprised of a cylinder block having a number of cylinder bores in which pistons are supported for reciprocation and which are connected by means of connecting rods to a crankshaft so as to provide the output for the engine. The construction and specific configuration of the engine 11 is not significant to the invention, as aforenoted, and for that reason these components have not been illustrated. Also, as will become apparent, the invention may be practiced in conjunction with either inline or V type engines and the manner in which this may be accomplished will be described later by reference to FIGS. 2 and 3.

The engine 11 includes a cylinder head, which is shown in phantom and which is identified generally by the reference numeral 12, in which individual combustion chambers 13 and 14 are formed. As is well known, the combustion chambers 13 and 14 are defined in part by recesses in the face of the cylinder head 12 that mates with the associated cylinder block, with the cylinder bores of the block and with the heads of the pistons. The recesses in the respective cylinder heads are identified by the reference numerals 15 and 16.

Each combustion chamber 13 and 14 is served by an induction system constructed in accordance with an embodiment of the invention. The induction system associated with the combustion chamber 13 includes three intake ports 17, 18 and 19 that are defined by valve seats. Poppet valves not shown) are supported within the cylinder head 12 and cooperate with the valve seats 17, 18 and 19 so as to control the flow of intake charge into the chamber 13. In a like manner, valve ports defining valve seats 21, 22 and 23 are provided for the chamber 14 which are likewise associated with intake valves that are not shown. The intake valves for each of the chambers 13 and 14 may be operated in any suitable manner by an overhead mounted camshaft. Although it is not necessary to the invention, the valves associated with each of the ports 17, 18 and 19 and 21, 22 and 23 may be operated in unison by the camshaft.

A first intake passage 24 is formed in the cylinder head 12 and an associated intake manifold for serving the intake ports 17 and 18. The first intake passage 24 has a common inlet 25 and a relatively large effective cross-sectional area that is divided into a pair of branches 26 and 27 each of which terminates at the respective intake port 17 and 18. These branches 26 and 27 merge relatively close to the valve ports 17 and 18. In a similar manner, a second intake passage 28 is formed in the cylinder head 12 and intake manifold and extends from an inlet 29 to serve the inlet ports 21 and 22 through respective branches 31 and 32. First and second charge formers in the form of carburetors 33 and 34 are provided at the respective inlets to the passages 25 and 29 so as to respectively provide at least a portion of the medium and high speed charge requirement for the respective combustion chambers 13 and 14. The carburetors 33 and 34 have respective throttle valves 35 and 36 that are linked together by means of an appropriate linkage system so that the throttle valves 35 and 36 will be opened in unison. In the illustrated embodiment, the carburetors 33 and 34 are depicted as being of the air valve type and each includes a respective air valve 37 and 38 which operates in a known manner so as to control the pressure drop across the induction passage of the carburetors 33 and 34 as well as the fuel flow.

A third intake passage 39 is provided between the first and second intake passages 24 and 28 and has a pair of branch sections 41 and 42 that extend to the respective inlet ports 19 and 23 of the combustion chambers 13 and 14, respectively. The third intake passage 39 has a relatively smaller effective cross-sectional area than the passages 24 and 28 and has an inlet 43 at which a charge former in the form of a carburetor 44 is provided. The carburetor 44, like the carburetors 33 and 34, has a throttle valve 45 and an air valve 46 that control the effective flow through the induction passage of the carburetor.

The throttle valve 45 is connected to the throttle valves 35 and 36 through a linkage system that provides that the throttle valve 45 will be opened first while the throttle valves 35 and 36 are held in a closed position. After a predetermined degree of opening of the throttle valve 45, this linkage system will effect progressive opening of the throttle valves 35 and 36 (which has been aforenoted operate in unison) until all throttle valves are fully opened. Thus, the throttle valve arrangement operates in a staged sequence so that the initial charge requirements for the engine will be supplied by the charge former 44 to the individual chambers 13 and 14 through the inlet ports 19 and 23. Thus, relatively large gas velocities may be enjoyed that will improve combustion and fuel charging. However, as the load and speed of the engine increases, the throttle valves 35 and 36 will be progressively opened so as to provide additional fuel/air charge to the chambers through the intake ports 17 and 18 and 21 and 22.

It has been noted that the intake passage branches 41 and 42 serve the chambers 13 and 14, respectively, through the intake ports 19 and 23. Since the throttle valves 35 and 36 are normally closed at idle and low speed running, there will be little or no fuel/air charge supplied to the respective chambers through the intake passages 24 and 28. This has been found to result in somewhat poor mid-range running and during the transition period immediately before and after the opening of the throttle valves 35 and 36. In order to avoid these difficulties and significantly improve running at low and mid-range, a small balance passage 47 interconnects the inlet passage branch 41 with the inlet passage 27 and a similar branch passage 48 connects the branch passage 42 with the inlet passage 28. Thus, even when the throttle valves 35 and 36 are closed, there will be some fuel/air charge delivered to the chambers 13 and 14 through the intake ports 17, 18 and 31, 32. This, as has been noted, significantly improves the transitional running and provides a better torque curve throughout the entire engine load and speed ranges.

Each chamber 13 and 14 is provided with a respective pair of exhaust passages 49, 51 and 52, 53 that extend from exhaust ports 54, 55, 56 and 57 in which exhaust valves are positioned. The exhaust gases then may flow from the respective chambers 13 and 14 to the atmosphere through the exhaust ports 54, 55, 56 and 57 and exhaust passages 49, 51, 52 and 53.

Figure 2:
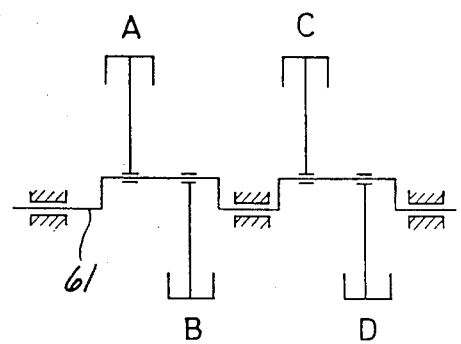
FIG. 2 is a partially schematic view showing how the invention can be applied to a V type or opposed engine.
Figure 3:
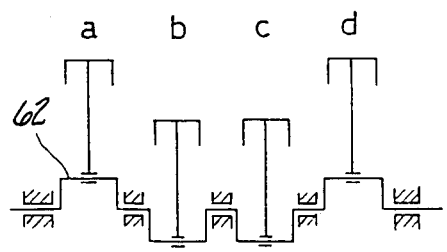
FIG. 3 is a partially schematic view showing how the invention can be applied to an inline type of engine.

Whereas the charge formers 33 and 34 each serve only a single chamber of the engine, the charge former 44 serves two chambers. In order to provide equal flow to both chambers and to insure proper mixture distribution and the best possible flow characteristics through the charge former or carburetor 44, it is desirable if the firing orders of the chambers 13 and 14 are disposed so that they are displaced at a fairly substantial crank angle from each other. Preferably, this crank angle should be at least equal to 360°. FIGS. 2 and 3 are schematic views showing how this arrangement can be enjoyed with either V type or inline engines, respectively.

FIG. 2 illustrates an engine in which the cylinder block is formed with respective banks that support pistons A and C and B and D, respectively. The banks may be disposed at any angle and the pistons A and C may be opposed from the pistons B and D if an opposed cylinder bank (flat) engine is employed. The pistons A, B, C and D are connected by respective connecting rods to a crankshaft 61 that has respective adjacent throws so that the connecting rods associated with the pistons A and B are connected to the same throw and those with the pistons C and D are connected to the same throw. These throws may be aligned or at the same angular relationship with each other but the firing order is chosen so that the spark plug associated with piston A fires 360° prior to the spark plug associate with the piston C. In a similar manner, the firing of the spark plugs associated with the pistons B and D are 360° out of phase.

The manifolding and induction system associated with an engine of the type as shown in FIG. 2 is such that the pistons A and C will correspond to the combustion chambers 14 and 13, respectively, as shown in FIG. 1. In a similar manner, the pistons B and D will correspond to the combustion chambers 13 and 14 as shown in FIG. 1 so that the single carburetor 46 associated with the bank of pistons A and C will serve both of these pistons while the single carburetor 46 associated with the bank containing the pistons B and D will serve each of the combustion chambers associated with these pistons.

Referring now to FIG. 3, an inline type of engine is shown wherein cylinders containing pistons a, b, c and d are all aligned with each other. The pistons a, b, c and d are connected by respective connecting rods to individual throws of a crankshaft 62. The pistons a and d are in phase and the pistons b and c are in phase due to the orientation of the throws, however, the pistons a and d and b and c fire 360° from each other. The manifolding arrangement associated with this type of engine will have the piston a be associated with a combustion chamber 14 as shown in FIG. 1 and the piston d associated with a combustion chamber 13 as shown in FIG. 1. Hence, the single carburetor 46 will serve both of these combustion chambers while the carburetor 34 will serve the combustion chamber associated with the piston a and the carburetor 33 will serve the combustion chamber associated with the piston d. In a like manner, the pistons b and c correspond to the combuston chambers 14 and 13 and a single carburetor 46 will serve both of these combustion chambers while the carburetor 34 will serve the combustion chamber associated with the piston b and the carburetor 33 will serve the combustion chamber associated with the piston c.

It should be readily apparent from the foregoing description that a very effective induction system is provided wherein good performance will be enjoyed throughout the engine load and speed ranges while maximum power output is possible. In addition, a firing order arrangement is associated with the respective cylinders so as to insure good mixture distribution and a relatively simple and uncomplicated induction system. In addition to the embodiments of the invention disclosed and described, various changes and modifications may be made without departing from the spirit and scope of the invention, as defined by the appended claims.

We claim:

1. In an internal combustion engine having a variable volume chamber comprising first, second and third intake passages each serving said chamber through respective first, second and third intake ports, a first charge former for supplying a fuel/air mixture to said chamber through said first and second intake passages, and a second charge former for supplying a fuel/air mixture to said chamber through said third intake passage.

2. In an internal combustion engine as set forth in claim 1 wherein at least one of the charge formers comprises a carburetor.

3. In an internal combustion engine as set forth in claim 2 wherein both of the charge formers comprise carburetors.

4. In an internal combustion engine as set forth in claim 1 further including balance passage means interconnecting the third intake passage with one of the other intake passages upstream of the intake ports.

5. In an internal combustion engine as set forth in claim 4 wherei the first and second intake passages have a common inlet.

6. In an internal combustion engine as set forth in claim 5 wherein the balance passage extends to the common portion of the first and second intake passages.

7. In an internal combustion engine as set forth in claim 6 wherein the balance passage is interconnected to the common portion in close proximity to the first and second intake ports.

8. In an internal combustion engine as set forth in claim 1 wherein the charge formers have staged throttle valve controls wherein the second charge former supplies substantially all of the idle and low speed charge requirements for the chamber and the first charge former supplies a portion of the charge requirements only at higher speeds and loads.

9. In an internal combustion engine as set forth in claim 8 wherein at least one of the charge formers comprises a carburetor.

10. In an internal combustion engine as set forth in claim 9 wherein both of the charge formers comprise carburetors.

11. In an internal combustion engine as set forth in claim 10 further including balance passage means interconnecting the third intake passage with one of the other intake passages upstream of the intake ports.

12. In an internal combustion engine as set forth in claim 11 wherein wherein the first and second intake passages have a common inlet.

13. In an internal combustion engine as set forth in claim 12 wherein the balance passage extends to the common portion of the first and second intake passages.

14. In an internal combustion engine as set forth in claim 13 wherein the balance passage is interconnected to the common portion in close proximity to the first and second intake ports.

15. In an internal combustion engine as set forth in claim 1 further including a second variable volume chamber and fourth, fifth and sixth intake passages each serving said second chamber through respective fourth, fifth and sixth intake ports, said fourth intake passage having a common inlet with the third intake passage and being served by the second charge former and further including a third charge former for supplying a fuel/air mixture to said second chamber through said fifth and sixth intake passages.

16. In an internal combustion engine as set forth in claim 15 wherein the first and second chambers fire out of phase with each other.

17. In an internal combustion engine as set forth in claim 16 wherein the charge formers are each provided with respective throttle valves for controlling the flow therethrough and further including staged linkage means for operating said throttle valves so that the second charge former supplies substantially the full idle and low speed charge requirements of the first and second chambers and the first and third charge formers supply a portion of the charge requirements of the respective first and second chambers at wide open throttle.

18. In an internal combustion engine as set forth in claim 17 wherein at least the second charge former is a carburetor.

19. In an internal combustion engine as set forth in claim 18 wherein all of the charge formers are carburetors.

20. In an internal combustion engine as set forth in claim 19 further including balance passage means extending between the third intake passage and at least one of the first and second intake passages and between the fourth intake passage and at least one of the fifth and sixth intake passages.

21. In an internal combustion engine as set forth in claim 20 wherein the first and second intake passages have a common inlet and the fifth and sixth intake passages have a common inlet, the first and third charge formers being positioned in the respective common inlets.

22. In an internal combustion engine as set forth in claim 21 wherein the balance passages extend to the common portions of the first and second and fifth and sixth intake passages.

23. In an internal combustion engine as set forth in claim 22 wherein the balance passages extend to the common portions contiguous to the respective intake ports.

24. An induction system for an internal combustion engine comprising first and second variable volume chambers, a first intake passage serving said first chamber through a first intake port, a second intake passage serving said second chamber through a second intake port, a third intake passage serving both of said first and second chambers through respective third and fourth intake ports, and a single charge former for supplying a fuel/air mixture to said first and second chambers through said third intake passage.

25. An induction system as set forth in claim 24 further including charge forming means for supplying a fuel charge to the first and second intake passages.

26. An induction system as set forth in claim 25 wherein the charge forming means supplying the first and second intake passages comprise separate charge formers, one for each of said passages.

27. An induction system as set forth in claim 25 wherein the single charge former and the charge forming means have staged throttle valves wherein the single charge forming means supplies the fuel/air charge requirements of the first and second chambers at idle and low speeds and the charge forming means supplies a portion of the wide open charge requirements of the first and second chambers.

28. An induction system as set forth in claim 27 wherein the charge forming means supplying the first and second intake passages comprise separate charge formers, one for each of said passages.

29. An induction system as set forth in claim 24 further including balance passage means extending between the third intake passage and each of the first and second intake passages.

30. An induction system as set forth in claim 29 further including poppet valves for controlling the flow through each of the intake ports.

31. An induction system as set forth in claim 24 wherein the first and second chambers fire out of phase with each other.

* * * * *